(12) United States Patent  
Day et al.

(10) Patent No.: US 8,285,707 B2
(45) Date of Patent: Oct. 9, 2012

(54) METHOD OF QUERYING RELATIONAL DATABASE MANAGEMENT SYSTEMS

(75) Inventors: Paul Reuben Day, Rochester, MN (US); Thomas Owen McKinley, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1314 days.

(21) Appl. No.: 11/557,601

(22) Filed: Nov. 8, 2006

(65) Prior Publication Data

US 2008/0109424 A1    May 8, 2008

(51) Int. Cl.
G06F 17/30     (2006.01)
G06F 7/00      (2006.01)

(52) U.S. Cl. ......... 707/713; 707/718; 707/723; 707/769

(58) Field of Classification Search .................. None
See application file for complete search history.

(56) References Cited

U.S. PATENT DOCUMENTS 6,360,214 B1* 3/2002 Ellis et al. ............................ 1/1
2005/0177557 A1* 8/2005 Ziauddin et al. .................. 707/3

FOREIGN PATENT DOCUMENTS

CN           1534520 A    10/2004

* cited by examiner

Primary Examiner — Loan T Nguyen
(74) Attorney, Agent, or Firm — Streets & Steele (57) ABSTRACT

Database management systems and methods for searching a database are disclosed. In one embodiment, an inspector examines a plan cache or a program containing embedded queries. A plurality of similar queries is identified, and an alias is generated that satisfies the plurality of queries. The alias may be executed on a database to output a result set. Queries belonging to the alias may be executed on the result set of the alias, rather than on the database. Accordingly, efficiency is improved and runtime costs are reduced as compared to conventional database management systems.

20 Claims, 6 Drawing Sheets

| SALES_FILE ||||||
|---|---|---|---|---|---|
| STORE | STATE | CITY | SALES | EXPENSES | MANAGER |
| 1234 | MN | ROCHESTER | $1,342,765.00 | $234,512.00 | CYNTHIA JOHNSON |
| 2345 | MN | ROCHESTER | $2,132,451.00 | $234,125.00 | ... |
| 3456 | MN | ROCHESTER | $987,654.00 | $134,215.00 | |
| 9977 | MN | EAST GRAND FORKS | $5,123,456.00 | $854,645.00 | |
| 9988 | MN | EAST GRAND FORKS | $765,432.00 | $745,124.00 | |
| 2424 | MN | DULUTH | $564,234.00 | $101,210.00 | |
| 2524 | MN | DULUTH | $987,456.00 | $97,456.00 | |
| 5547 | MN | FROST | $2,123,212.00 | $312,213.00 | |
| 3536 | MN | COON RAPIDS | $1,234,569.00 | $213,451.00 | |
| 2154 | MN | COON RAPIDS | $1,234,568.00 | $202,148.00 | |
| 7707 | TX | HOUSTON | $5,132,451.00 | $1,036,987.00 | |
| 7708 | TX | HOUSTON | $987,457.00 | $65,451.00 | |
| 7821 | TX | SAN ANTONIO | $1,213,245.00 | $154,654.00 | |
| 1973 | TX | BUDA | $456,213.00 | $154,745.00 | |
| 3791 | TX | BUDA | $247,547.00 | $568,745.00 | |
| | | | | | |
| | | | | | |
| | | | | | |

```
FROM TABLES......................._____________________

SELECT COLUMNS................._____________________

WHERE CONDITIONS............_____________________

GROUP BY COLUMNS..........._____________________

HAVING CONDITIONS..........._____________________

ORDER BY COLUMNS..........._____________________

FOR UPDATE OF COLUMNS.................._____________________

TYPE CHOICES, PRESS ENTER.
```

FIG. 2

Q1: SELECT: STATE, CITY, STORE, AVG(SALES)
    FROM: SALES_FILE(S)
    WHERE: YEAR = 2005 AND STATE = 'MN'
    GROUP BY: STATE, CITY, STORE

Q2: SELECT: STATE, CITY, STORE, SUM(SALES)
    FROM: SALES_FILE(S)
    WHERE: YEAR = 2005 AND STATE = 'MN'
    GROUP BY: STATE, CITY, STORE

Q3: SELECT: STATE, CITY, STORE, SUM(EXPENSES)
    FROM: SALES_FILE(S)
    WHERE: YEAR = 2005 AND STATE = 'MN'
    GROUP BY: STATE, CITY, STORE

Q4: SELECT: STATE, CITY, STORE, SUM(SALES)
    FROM: SALES_FILE(S)
    WHERE: YEAR = 2005 AND STATE = 'MN'
    GROUP BY: STATE, CITY, STORE
    ORDER BY: STATE, CITY, STORE

Q5: SELECT: STATE, CITY, STORE, SUM(SALES)
    FROM: SALES_FILE(S)
    WHERE: YEAR = 2005 AND STATE = 'MN'
    GROUP BY: STATE, CITY, STORE
    ORDER BY: SUM(SALES)

A1: SELECT: STATE, CITY, STORE, AVG(SALES), SUM(SALES), SUM(EXPENSES)
    FROM: SALES_FILE(S)
    WHERE: YEAR = 2005 AND STATE = 'MN'
    GROUP BY: STATE, CITY, STORE

METHOD OF QUERYING RELATIONAL DATABASE MANAGEMENT SYSTEMS

BACKGROUND OF THE INVENTION

1. Field of the Invention

The present invention relates to database management systems and methods.

2. Description of the Related Art

Structured query language (SQL) and its derivatives are among the most popular query languages for database management systems (DBMS). Although historically run on minicomputers and mainframes, SQL (optionally pronounced like "sequel") is increasingly being supported by PC database systems because it supports distributed databases, which are spread out over several computer systems. A version of SQL is defined by both ANSI and ISO, though there are many extensions to and variations on the version of the language defined by these standards bodies.

It is common for users of SQL to run many nearly identical queries, with only slight deviations between each query. For example, a user searching for retailer information pertaining to a geographical region may perform a series of queries specifying the same geographical parameters, such as state, city, and store. With each query, the user may output different information, such as average sales, average expenses, total sales, total expenses, and so forth. A conventional database management application will typically gather these results from scratch with each query. The application will then cache the output in case the exact same query is run again. However, exact queries are rarely repeated. The process of repeatedly gathering nearly identical data results in a sub-optimal allocation of system resources.

Therefore, an improved method is needed for querying a database that more optimally utilizes resources of a database management system. The method would preferably minimize runtime costs and system resources, as well as produce faster search results.

SUMMARY OF THE INVENTION

The present invention includes database management systems, computer program products, and methods for searching a database. In a first embodiment, a method of searching a database is provided. A plurality of queries is chosen. A data set satisfying the chosen plurality of queries is created. A target query satisfied by the data set is also created. The target query is executed on the data set.

In a second embodiment, a computer program product includes a computer usable medium having computer usable program code for searching a database. The computer program product includes computer usable program code for choosing a plurality of queries, computer usable program code for creating a data set satisfying the chosen plurality of queries, computer usable program code for choosing a target query satisfied by the data set, and computer usable program code for executing the target query on the data set.

In a third embodiment, a database management system is provided. The database management system includes a database and a query source. An inspector is included for choosing a plurality of similar queries from the query source and creating an alias query therefrom. A target query identifier is included for choosing a target query satisfied by the alias. A query execution module is included for executing the alias query on the database and executing the target query on the result set of the alias query.

DETAILED DESCRIPTION OF PREFERRED EMBODIMENTS

The present invention includes methods that may be performed on a computer by a database management application implementing SQL, one of SQL's many variants, or another database syntax such as DDL or XML. An application according to the invention may be a standalone DBMS application or an application adapted for interfacing with an existing DBMS application. In one embodiment, the application includes an "inspector" component that examines a query optimizer's access plan cache, observing the SQL statements or other type of queries being run and looking for similarities. The application creates a data set that satisfies the similar queries, i.e., a data set other than the original database table that contains sufficient data to execute all of the similar queries. The data set is typically, but not necessarily, equal to a superset of the output of the individual queries. The application may construct the data set by executing each of the similar queries and combining their individual output. Alternatively, the application may inferentially create an alias SQL statement ("alias") based on the syntax of the similar queries. The application may then execute the alias to compute the superset. Subsequently, when running a query that requests a subset of the alias or that is otherwise satisfied by the data set, the application may access the cached data set (i.e., the output of the alias), rather than the original table. Searches are thereby performed more efficiently. The data set is typically much smaller than the original table, so it may be more quickly searched. Also, the cached output may include columns that have already been operated upon, so that the operations need not be repeated during the execution of subsequent queries. Runtime costs are minimized and system resources are more optimally utilized.

Figure 1:
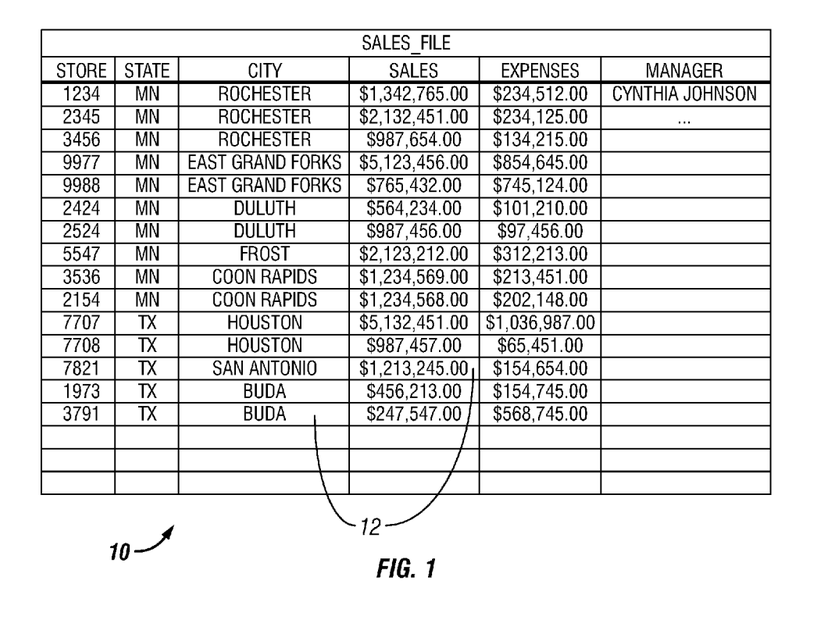
FIG. 1 is an excerpt of a sample data table stored on one or more computers and accessible by a database application.

FIG. 1 is an excerpt of a sample data table 10 stored on one or more computers and accessible by a database application program. The table 10 is named SALES_FILE, and has multiple columns containing hypothetical data for a chain of retail stores. The columns shown are labeled Store, State, City, Sales, Expenses and Manager. Individual fields 12 are located at the intersection of each row and column. The table 10 is small for purpose of illustration, though the size of an actual database table is unlimited. The table 10 may include many more rows and columns not shown in the figure. Also, table 10 may be searched along with other tables located on the same or another computer system.

Figure 2:
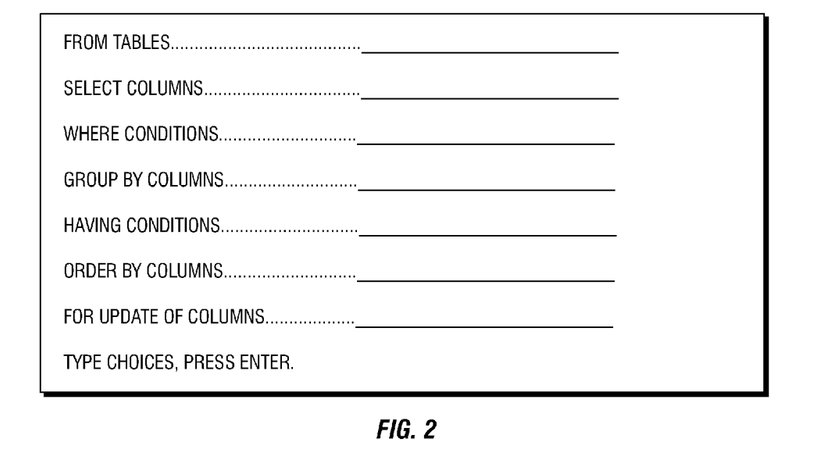
FIG. 2 is an exemplary graphical user interface (GUI) for inputting a query in the form of a "SQL statement."

FIG. 2 is an exemplary graphical user interface (GUI) for inputting a query in the form of a "SQL statement." The GUI includes fields for inputting some standard SQL keywords. The keywords and their associated syntax may vary slightly from application to application, although one skilled in the art will recognize any analogous commands and appreciate the suitability of the invention for use therewith. SELECT is a data retrieval command commonly used to select columnar data from a database. Additional keywords are used to further specify the data to be selected and any operations to be performed. The result of the SELECT command is called the "result set," which may be stored, represented, and/or displayed in tabular form, i.e., in a table having rows and columns. The number of rows and columns in the result set typically differs from the number of rows and columns in the original table(s).

FROM is a keyword commonly used to indicate the table(s) from which the data is to be selected. To conditionally select data from the table(s), a WHERE clause can be added to the SELECT statement. A number of operators, such as "=," "<>," and "BETWEEN" may be used with the WHERE clause. Aggregate functions such as SUM and AVG operate on multiple values of a column and return a single value every time they are called. Without more specificity, the output of an aggregate function performed on a column would be a column wherein each field in that column is the aggregate value. Therefore, an aggregate function is typically accompanied by a GROUP BY command. The GROUP BY command combines rows with related values. For example, where column A of a table contains city names and column B contains numerical values, performing a GROUP BY on column A and an AVG function on column B will typically output a City column having one entry for each city and an AVG(B) column having an average numerical value associated with each city. The HAVING command operates similarly to WHERE, but on rows that have previously been grouped in a GROUP BY command. ORDER BY is used to identify which columns are used to sort the resulting data. Other commands, keywords, and operations may also be used.

Figure 3:
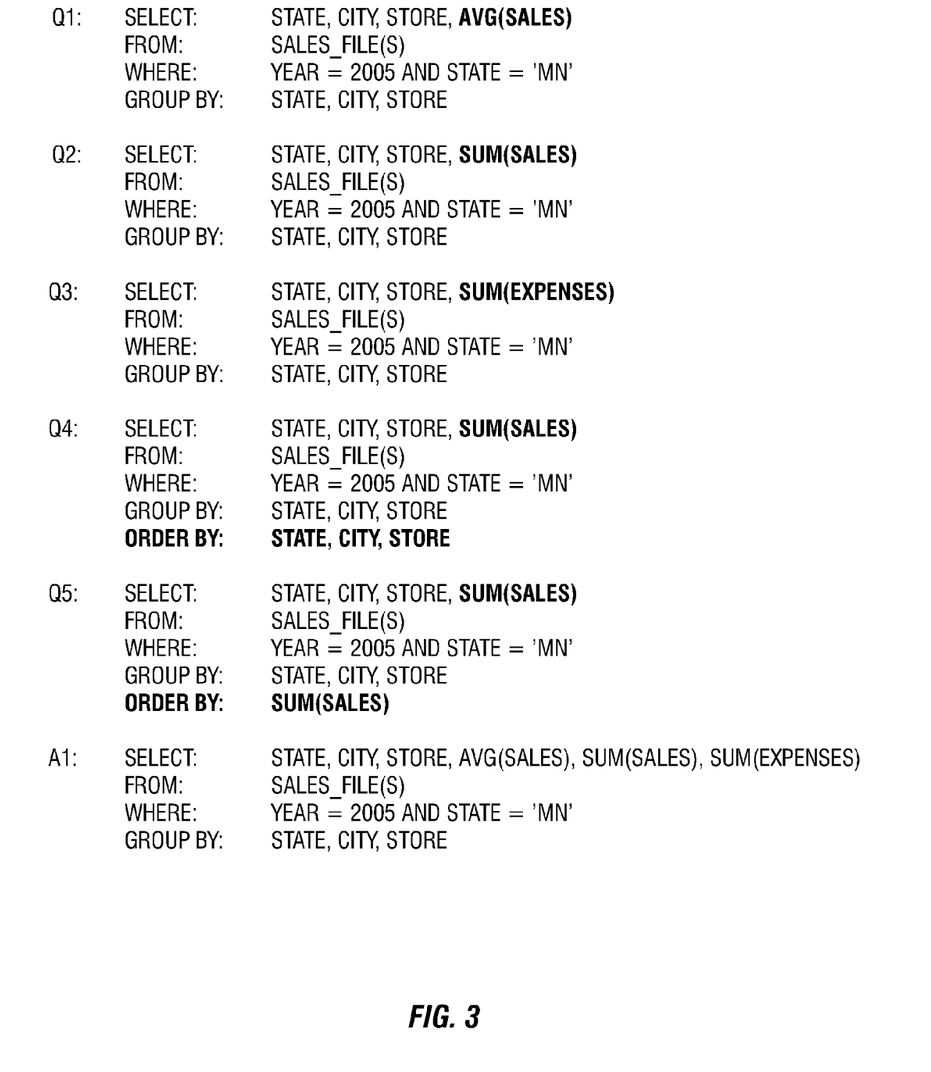
FIG. 3 is a group of queries in the form of SQL statements Q1 through Q5, along with an alias A1 satisfying Q1 to Q5.

FIG. 3 is a group of queries in the form of SQL statements Q1 through Q5, along with an alias A1 satisfying Q1 to Q5. The queries may be "executed on" the table 10 of FIG. 1. When each query is executed, it selects columns from table 10 and performs any operations specified in the query to compute a tabular result set. Differences between the SQL statements Q1 to Q5 are highlighted in boldface font. Q1 through Q5 all call out the columns State, City, and Store. Q1 also calls out the SALES column, and performs an aggregate function AVG(Sales). Q4 also calls out the SALES column, and performs a different aggregate function SUM(Sales). Q4 and Q5 each perform an additional sort, with Q4 ordering the output according to State, City, Store, and Q5 ordering the output according to SUM(Sales). The sort function typically does not change the content of the output, but only the order in which it is displayed. Queries Q1 to Q5 all have the same GROUP BY and WHERE clauses in common, and will therefore have the same number of rows.

A1 is a SQL statement which, when executed, outputs a data set that is sufficient to satisfy all of the queries Q1 to Q5. In this example, the result set of A1 would be equivalent to a "superset" formed by joining the result sets for Q1 to Q5. The superset may be formed by executing each query Q1 to Q5 and joining their result sets. Alternatively, in this example and in many other instances, it is possible to ascertain the alias A1 directly from the syntax of queries Q1 to Q5, without actually computing the result sets for Q1 to Q5. The result set for A1 (the superset) includes the columns State, City, Store, AVG (Sales), SUM(Sales), and SUM(Expenses), which can optionally be ascertained directly from the syntax of Q1 to Q5. The superset columns State, City, Store are essentially the columns by the same name selected from the table 10, as operated upon by the WHERE and GROUP BY clauses. The superset columns AVG(Sales), SUM(Sales), and SUM(Expenses) are the result of aggregate functions performed on columns Sales, and Expense of the table 10, and are also operated upon by the WHERE and GROUP BY clauses.

Although Q4 and Q5 both specify an additional sort, sort operations generally change only the order and not the content of the data columns. Thus, it can be said that the superset of A1 is at least "substantially equivalent" to the combined result sets of Q1 to Q5, even if the order of data in the superset differs from the order of data in the result set of A1. By convention adopted herein, A1 and the superset are said to "satisfy" the queries Q1 to Q5, in that these queries may be executed on the superset, instead of the original data table. Likewise, the queries Q1 to Q5 are said to "belong to" the alias A1. Other SQL statements that are capable of being executed on the superset are also said to be satisfied by the superset and belong to the alias A1.

The superset will typically be smaller than the original table, and can therefore be searched much more efficiently than the original table. Furthermore, because columns of the original table have already been operated upon to create the superset, at least some of those operations need not be repeated with the subsequent execution of SQL statements satisfied by the superset and belonging to the alias. This efficient approach desirably minimizes system resources and runtime expenses, particularly where a user is entering many nearly identical queries.

In another embodiment, a superset according to the invention may also be produced even when a set of queries have different WHERE clauses. Whereas the SELECT command typically selects columns from a table, the WHERE clause typically specifies rows of the table that satisfy the WHERE clause. The rows typically represent values tabulated under the selected columns. For example, an application executing the query "SELECT F1, F2, F3 from T1 where F1=1" will select values tabulated under columns F1, F2, F3, but will only select those values from rows wherein F1=1. Another query statement may specify a different WHERE clause, and possibly different columns as well. The application could execute these queries in a single pass through a large table. Especially where the source table is large, multiple queries could be satisfied with one pass through the table. This is beneficial because there is a premium on time spent in a very large database. The reduced cost of querying large database tables make this approach appealing. Such an embodiment therefore represents another way in which many queries can be satisfied with one superset. Instead of producing a superset of the result fields, this embodiment may produce a superset of result rows. In this instance, the superset may, therefore, include a collection of separate result sets that may be used to satisfy multiple queries.

The SELECT command specifies a description of the desired result set, but the physical operations executed to produce that result set are generally determined with an access plan. An access plan is a control structure that describes the actions necessary to satisfy each query. Translating a query into an efficient query plan is left to a "query optimizer" available in many or most DBMS applications, including conventional DBMS applications. The query optimizer is the component of a DBMS that attempts to determine the most efficient way to execute a query. The optimizer considers the possible query plans for a given input query, and attempts to determine which of those plans will be the most efficient. Cost based query optimizers assign an estimated "cost" to each possible query plan, and choose the plan with the least cost. Costs are used to estimate the runtime cost of evaluating the query, in terms of the number of I/O operations required, the CPU requirements, and other factors. The set of query plans examined is formed by examining the possible access paths (e.g. index scan, sequential scan) and join algorithms (e.g. sort-merge join, hash join, nested loops). The search space can become quite large depending on the complexity of the SQL query.

A plan cache is a repository that contains the access plans for queries that were optimized. The purpose of the plan cache is to facilitate the reuse of a query access plan at some future stage when the same query, or a similar query, is executed. Once an access plan is created, it is available for use by all users and all queries, regardless of where the query originates. Furthermore, when an access plan is tuned, when creating an index for example, all queries can benefit from this updated access plan. This eliminates the need to re-optimize the query, resulting in greater efficiency and faster processing time.

The plan cache may be interrogated each time a query is executed in order to determine if a valid access plan exists that satisfies the requirements of the query. If a valid access plan is found, it is used to implement the query. Otherwise a new access plan is created and stored in the plan cache for future use. The plan cache may be automatically updated when new query access plans are created, or when new data become available. However, access plans generated by some query engines are not necessarily stored in the plan cache, and may instead be stored in a SQL package, a system-wide statement cache, or a job cache.

Figure 4:
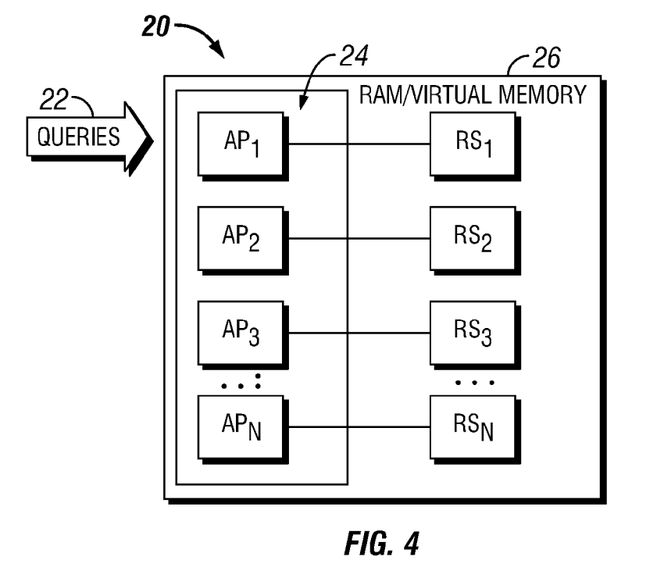
FIG. 4 is a schematic diagram of a conventional query access plan cache.
Figure 5:
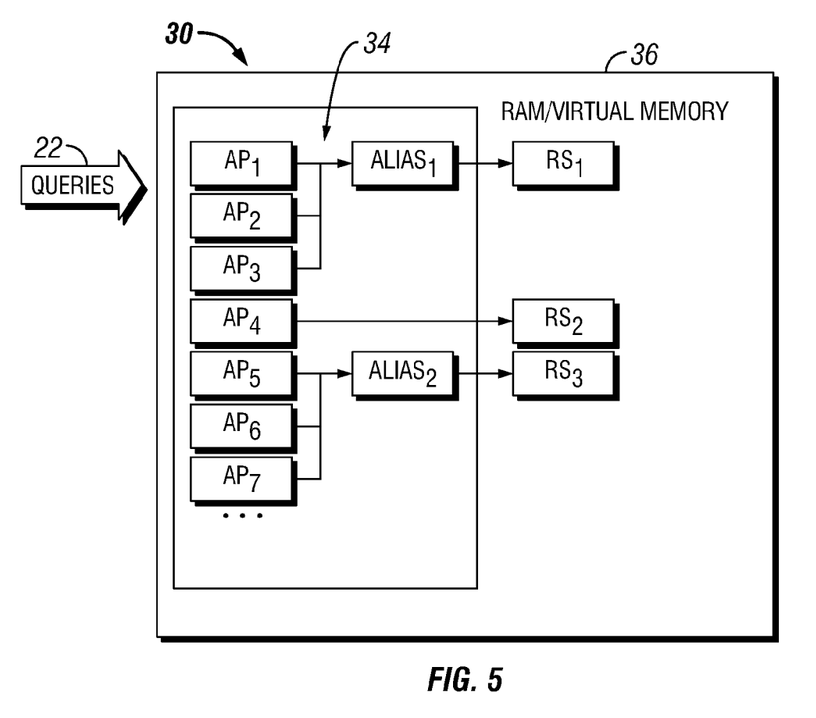
FIG. 5 is a schematic diagram of a query access plan cache with aliasing.

FIGS. 4 and 5 show portions of access plan caches that may be used to compare query optimization with and without aliasing. FIG. 4 is a schematic diagram of a conventional query access plan cache 20 generated by a conventional query optimizer. The conventional query optimizer processes queries 22 and generates a conventional set of access plans 24. The conventional access plans 24 are stored in the system's memory 26 as part of the access plan cache 20. Any number of access plans may be stored in the conventional access plan cache 20, represented as AP1 to APn. Each of access plans AP1 to APn are executed to produce corresponding result sets RS1 to RSn in a one-to-one relationship. These result sets are also stored in the system memory 26. As additional queries are run, the conventional query optimizer may reference the conventional access plan cache 20 to locate an access plan AP1 to APn that will satisfy the query being run. If an exact match is found to satisfy the query, the conventional query optimizer may output the corresponding result set RS1 to RSn. However, unless that exact query has previously been run, no match will be created, and the query will be executed from scratch on the original database table includes with the DBMS. This results in many result sets occupying the memory 26, most of which will never or rarely be re-used. Furthermore, many of these result sets are stored in memory 26, with one result set RS being stored for every access plan AP generated.

FIG. 5 is a schematic diagram describing the structure of an access plan cache with aliasing 30 generated by a query optimizer according to the invention. The query access plan cache 30 processes the queries 22 and generates an access plan cache 34 stored in the system's memory 36. Any number of access plans AP1 to APn are generated. However, the query access plan cache 30 further computes any number of aliases, such as Alias1 and Alias2. Rather than computing a result set RS for each access plan AP, the query optimizer instead computes an RS only for each alias. Desirably, there are fewer aliases than there are individual access plans AP. This improves the speed of executing subsequent queries. This also greatly reduces the amount of memory used. Thus, the query access plan cache 30 improves the efficiency and reduces the runtime costs of operating the alias-based query optimizer as compared with the conventional query optimizer of FIG. 5.

SQL statements can also be embedded in the code of some software applications. Such a program can use static and/or dynamic SQL statements. A static SQL statement is one in which all the components are known when the program is compiled. A dynamic SQL statement is one in which not all the components are known at compile time. In the latter case, the program receives all or part of the statement at runtime.

Figure 6:
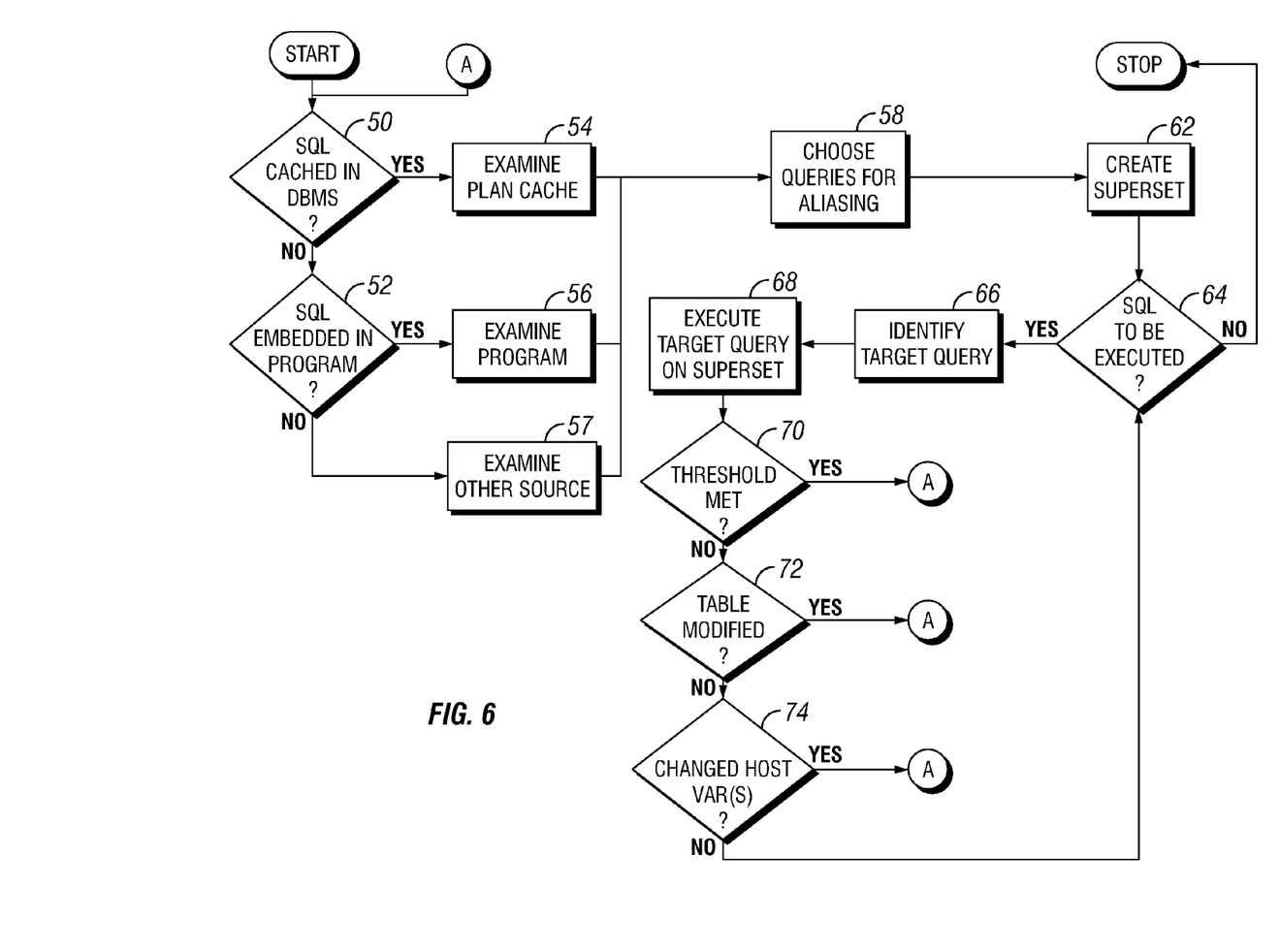
FIG. 6 is a flowchart describing a method of searching a database according to one embodiment of the invention.

FIG. 6 is a flowchart describing a method of searching a database according to one embodiment of the invention. A DBMS application performs the method, employing principles of aliasing according to the invention, to streamline the execution of search queries. An inspector, which in this embodiment is a component of the DBMS application, examines a group of SQL statements to identify similarities that can be used to more efficiently execute these and/or subsequent queries. The inspector may look for SQL statements within a plan cache according to steps 50 and 54, within SQL statements embedded in another software program according to steps 52 and 56, or to some other source according to step 57. The source of the SQL statements typically depends on the context and environment in which the method is deployed. The choice of source may therefore be predetermined by a system designer. Alternatively, an end user may make this determination according to the location of queries to be searched in a given session. Whatever the source of the SQL statements, the inspector examines that source in step 58 in search of SQL statements for which to create an alias. Generally, the inspector is looking for queries having some common characteristics, and that may therefore benefit from the streamlined principles of aliasing.

One way the inspector may choose similar queries in step 58 is to identify queries that specify one or more of the same columns. For example, the SQL statement "SELECT State, City, Store, AVG(Sales)" and the SQL statement "SELECT State, City, Store, SUM(Expenses)" could be identified as candidates for aliasing, because the execution of each query would require selecting columns State, City, and Store from a table in the database. Accessing the database table multiple times to repeatedly select those same columns for a number of queries is duplicative and unnecessarily increases runtime costs. Another approach is to identify queries specifying the same column operations. A column operation is an operation performed on a column other than simply selecting that column in its original format. For example, the SQL statement "SELECT City, SUM(Sales) . . . ORDER BY City" and the SQL statement "SELECT City, SUM(Sales) . . . ORDER BY SUM(Sales) are candidates for aliasing, in that performing and re-performing the same SUM operation on the Sales column is duplicative. In another example, the inspector may choose SQL statements having the same FROM and WHERE clauses. The FROM clause specifies the table(s) from which data is selected, such as FROM Sales_File. The WHERE clause specifies conditions, such as the condition WHERE AVG(Sales)>$1,000,000. Thus, multiple queries specifying the same tables and column operations may be chosen in step 58 for aliasing. Similarly, query statements that specify the same GROUP BY and HAVING clauses may be chosen by the inspector. Other similarities between queries may also be identified by the inspector for the purpose of aliasing.

In step 62, the queries chosen in step 58 are used to create a data set satisfying all of the queries. The data set is typically equal to a superset formed by combining the result sets for all of the queries chosen in step 58. Thus, to produce the superset, the application may simply execute each query selected in step 58 and combine the result sets. Alternatively, the application may create an alias query whose result set, when executed, will be equal to the superset. The alias may be formulated directly through examination of the syntax of the individual queries. The alias may then be executed to create the superset. For example, referring back to FIG. 3, the alias A1 may be formulated directly by examining the syntax of the queries Q1 to Q5, and selectively combining the columns and column operations specified therein. Then the superset may be created by executing A1, without requiring the execution of the individual queries Q1 to Q5. This approach avoids the intermediate computation of individual result sets, to further increase the efficiency of searching a database.

After the alias and/or superset are created, the application checks to see if there are any query statements to be executed in step 64. If so, then in step 66, the application examines query statements in search of a query (the "target query") that can be executed on the superset. In one embodiment, the target query may be selected from queries subsequently entered by a user following the creation of the superset in step 62. For example, a query that specifies columns or column operations that are also specified by the alias may be selected as a target query. Alternatively, the target query may instead be selected from among those queries that were chosen in step 58 if they were used to directly create an alias in step 62 without execution. Thus, by directly creating the alias and its superset in step 62, the query statements chosen in step 58 can now be executed on the superset, which avoids executing those queries on the original table, at least until the table data has changed. Overall, the runtime and associated costs are reduced, as compared with simply executing all the queries on the original data table. The degree of runtime reduction and cost savings may increase with the number of queries run, and the number of queries satisfied by each alias or superset. In general, the more queries per alias/superset, the greater the efficiency of the method as compared with a non-aliased method.

At some point, it may be desirable to re-compute an alias or superset, or to compute new or additional aliases or supersets. Step 70, for example, tests for any thresholds that have been met that would trigger the need for computation of new or updated supersets. The threshold may be determined according to one or more parameters, such as time. For instance, after a period of time elapses, the application may automatically re-compute any supersets previously created. One reason to do so is that databases may be periodically updated over time, which may alter the output of queries run on the database. Another parameter that may satisfy step 70 is the number of queries that have been run. A system designer could configure the application such that the superset is recomputed after a certain number of queries have been run. In step 72, a superset may be recomputed in response to modification of the table upon which the queries are executed. Step 72 could help avoid inconsistencies or other errors in output caused by a material change in the table.

It may be desirable not to re-compute the alias(s) and superset(s) automatically, such as each time a table is updated or after a time period has elapsed, where that may create ambiguity of results. Rather, when a certain threshold has been met, such as time period or number of queries processed, the application may first prompt the user whether to re-compute the alias(s) and/or superset(s) and only do so in response to affirmative user input. In response to other thresholds, it may not be necessary to first prompt a user. For example, where a host variable has changed, it is generally not necessary to prompt the user before updating the alias or superset, because that is essentially a change in what is being queried.

The application may time-stamp any outputted search results, creating a "checkpoint" of values, to let the user know the search results are valid as of a certain time. A new or updated alias and/or superset may also be computed in response to a substantially changed set of host variables. For example, if the previous 100 queries were searching on the state of Minnesota (MN), and suddenly the queries began focusing on Texas (TX), the application could compute a new alias/superset from the new Texas-based queries. In any of these instances, the application could return to a previous step, typically step 50, to begin the computation of new aliases and supersets. Alternatively, new aliases could be generated by modifying the existing aliases. For example, if the TX queries specify many of the same conditions, keywords, or commands (e.g. a similar WHERE clause) specified by the previous MN-based queries, a new alias satisfying the TX queries could be generated by changing State to TX in the WHERE clause of a previous MN-based alias.

Some users execute similar queries so routinely that it becomes viable to generate permanent or non-expiring aliases. For example, a real estate venture located in a particular city and state may exclusively perform real estate searches specifying a particular city and state, as well as other parameters. In such a case, a "permanent materialized query table" ("PMQT") may be generated from an alias. A DBMS application according to the invention may optionally suggest to the user to create a PMQT based on a certain parameter or threshold being reached. For example, the DBMS may prompt the user to create the PMQT based on the number of times an alias is used, the number of subset queries that match a particular alias, or the time estimated or actually needed to execute an alias. Alternatively, the DBMS may be configured to automatically generate an PMQT after the threshold has been reached.

Figure 7:
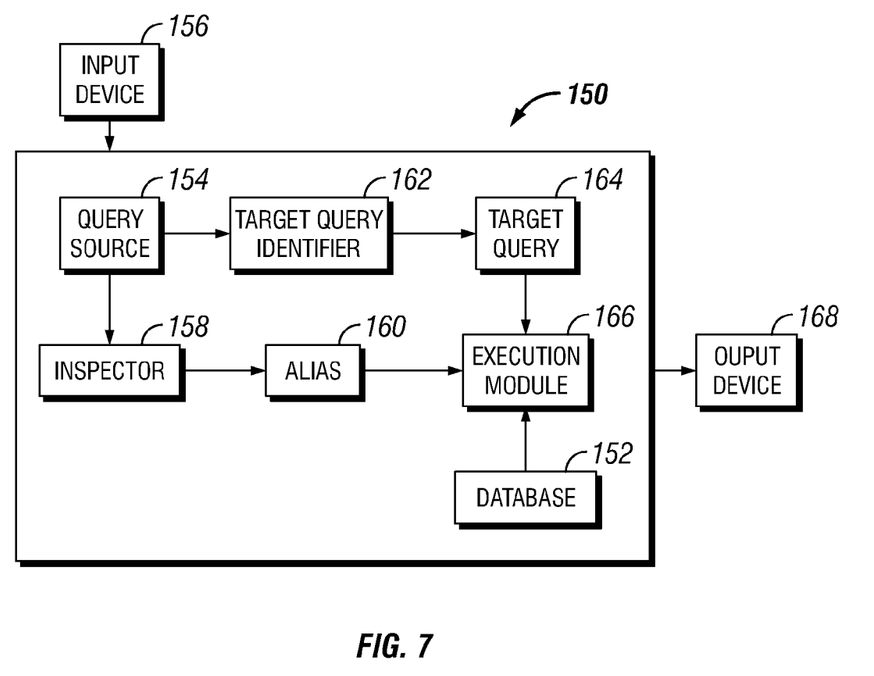
FIG. 7 is a schematic diagram of a computer system that may be configured for running a DBMS application according to an embodiment of the invention.

FIG. 7 is a schematic diagram of a database management system 150 employing aliasing principles according to the invention. A database 152 stores data, which may be embodied or displayed in a tabular format. A query source 154 may include an access plan cache, embedded queries such as embedded SQL statements, and individual queries submitted by an end user. An input device 156 is included for inputting information such as queries to the query source 154 and data to the database 152. An inspector 158 examines the query source 154 to identify and choose similar queries, such as SQL statements having one or more identical columns or column operations. The inspector 158 outputs an alias 160, which may be in the form of an alias query statement. A target query identifier 162 examines the query source 154 to identify a target query 164 that is satisfied by the alias 160. The target query 164 may be among the similar queries chosen by the inspector 158, or it may be another query, such as a query subsequently input by the user. An execution module 166 executes the alias 160 on the database 152 and caches the result set of the alias query 160. The execution module 166 then executes the target query 164 on the result set of the alias 160, which may be a superset of the similar queries chosen by the inspector 158. The result set of the executed target query 164 may be output to an output device 168, which may include a display or other audiovisual medium.

It should be recognized that the invention may contain both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
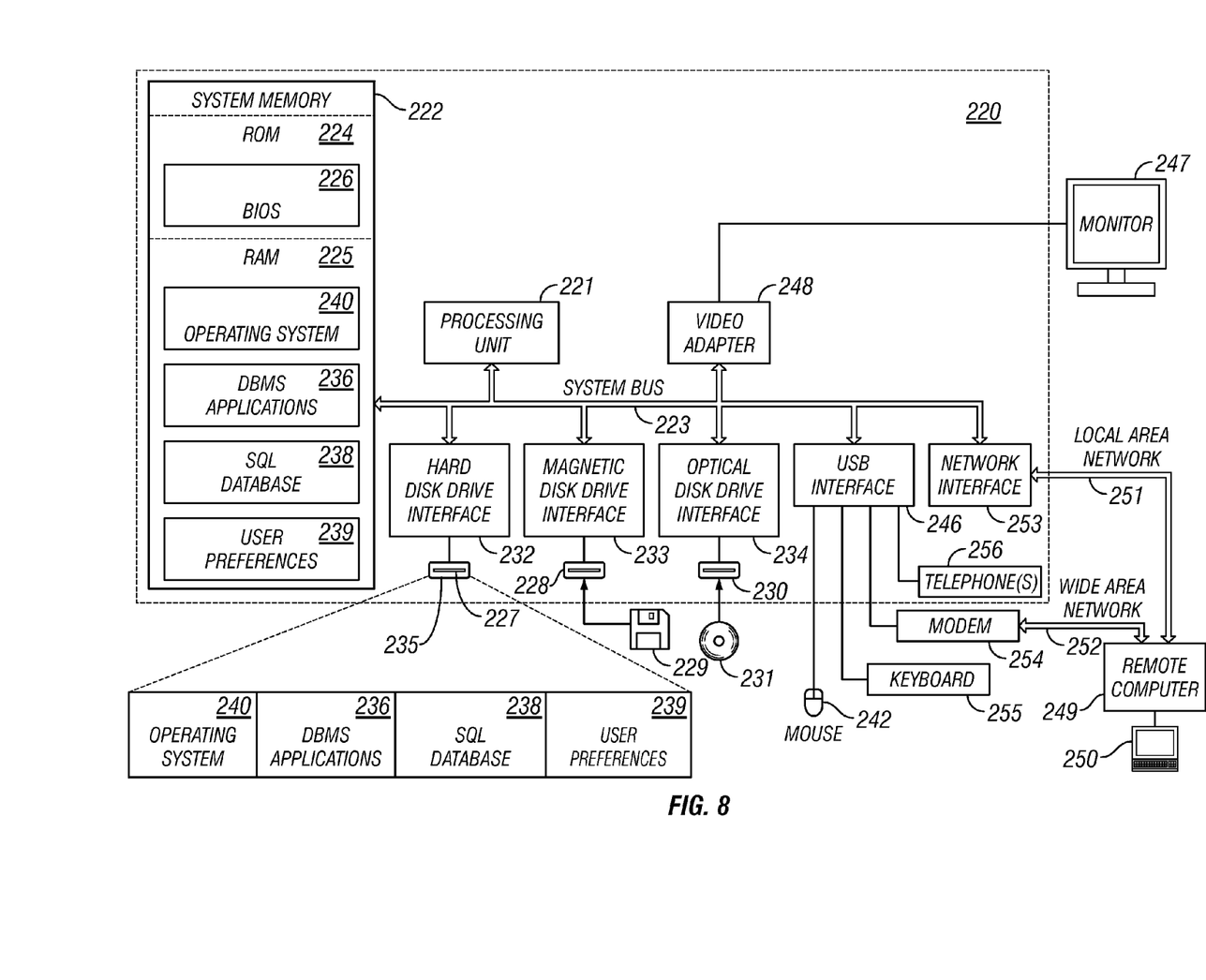
FIG. 8 is a schematic diagram of a computer system that may be configured for running a DBMS application according to an embodiment of the invention.

To illustrate, FIG. 8 is a schematic diagram of a computer system generally indicated at 220 that may be configured for running a DBMS application according to an embodiment of the invention. The computer system 220 may be a general-purpose computing device in the form of a conventional computer system 220. Generally, computer system 220 includes a processing unit 221, a system memory 222, and a system bus 223 that couples various system components, including the system memory 222, to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 8. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet. Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, DBMS application(s) 236, or the like. A SQL database 238 is included, which may include data arranged in tabular form, and/or data which may be output in tabular form. Data in the SQL database 238 may be input and periodically updated by a user and/or the DBMS application(s) 236. A user preferences database 239 may also be included.

Methods according to the present invention may be implemented by the DBMS application 236. The DBMS application(s) 236 may be a software application designed according to the invention. Alternatively, the DBMS application(s) may include a conventional DBMS application along with one or more applications components, such as an aliasing component, according to the invention. The DBMS application(s) 236 executes queries on the SQL database 238, which may include a plurality of tables. The DBMS application 236 generally comprises computer-executable instructions for querying the SQL database 238.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of searching a database, comprising:
   choosing a plurality of queries being executed on a database table;
   creating a data set that is smaller-than the database table and satisfies the plurality of executed queries;
   choosing a target query, other than one of the executed plurality of queries, that is satisfied by the data set; and
   executing the target query on the data set, wherein the executing is performed on a computer.

2. The method of claim 1, wherein the step of creating the data set comprises computing a result set for each of the plurality of queries and combining the computed result sets to form a superset.

3. The method of claim 1, wherein the step of creating the data set further comprises creating an alias query satisfying the plurality of queries and executing the alias query to output the data set.

4. The method of claim 3, wherein the step of choosing a target query that is satisfied by the data set comprises choosing a query specifying one or both of columns and column operations specified by the alias query.

5. The method of claim 1, wherein the step of choosing a target query that is satisfied by the data set comprises choosing a query specifying columns of the data set.

6. The method of claim 1, wherein the step of choosing the plurality of queries comprises choosing queries specifying one or more of the same columns.

7. The method of claim 1, wherein the step of choosing the plurality of queries comprises choosing queries specifying one or more equivalent operations.

8. The method of claim 1, wherein the step of choosing the plurality of queries comprises choosing queries having equivalent WHERE and FROM clauses.

9. The method of claim 1, wherein the step of choosing the plurality of queries comprises choosing queries having one or both of an equivalent GROUP BY clause and an equivalent HAVING clause.

10. The method of claim 1, further comprising choosing the plurality of queries from an access plan cache.

11. The method of claim 1, further comprising choosing the plurality of queries from embedded queries.

12. The method of claim 1, further comprising performing one or more additional operations on a result set of the executed target query.

13. The method of claim 1, further comprising:
    prompting a user whether to create another data set; and
    selectively creating the another data set in response to user input.

14. The method of claim 1, further comprising creating another data set after a predetermined period of time.

15. The method of claim 1, further comprising creating another data set in response to a modification of the database table.

16. The method of claim 1, further comprising creating another data set in response to a change in host variables of subsequent queries.

17. The method of claim 1, further comprising generating a materialized query table from an alias after a predetermined threshold has been reached.

18. A computer program product including computer usable program code embodied on a non-transitory computer usable medium for searching a database, the computer program product including:
    computer usable program code for choosing a plurality of queries being executed on a database table;
    computer usable program code for creating a data set that is smaller than the database table and satisfies the chosen plurality of queries;
    computer usable program code for choosing a target query, other than one of the executed plurality of queries, that is satisfied by the data set; and
    computer usable program code for executing the target query on the data set.

19. The computer program product of claim 18, further comprising computer usable program code for computing a result set for each of the plurality of queries and combining the computed result sets to form a superset.

20. The computer program product of claim 18, further comprising computer usable program code for creating an alias query satisfying the plurality of queries and executing the alias query to output the data set.

* * * * *